(12) United States Patent
Jang et al.

(10) Patent No.: US 8,867,466 B2
(45) Date of Patent: Oct. 21, 2014

(54) METHOD AND APPARATUS FOR ACTIVATING OR DEACTIVATING SECONDARY CARRIERS IN TIME DIVISION DUPLEX MOBILE COMMUNICATION SYSTEM USING CARRIER AGGREGATION

(75) Inventors: Jaehyuk Jang, Suwon-si (KR); Soenghun Kim, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 62 days.

(21) Appl. No.: 13/400,962

(22) Filed: Feb. 21, 2012

(65) Prior Publication Data

US 2012/0213129 A1    Aug. 23, 2012

Related U.S. Application Data

(60) Provisional application No. 61/444,844, filed on Feb. 21, 2011.

(30) Foreign Application Priority Data

Feb. 9, 2012    (KR) .................... 10-2012-0013283

(51) Int. Cl.
| | | |
|---|---|---|
| H04W 4/00 | (2009.01) | |
| H04L 1/00 | (2006.01) | |
| H04L 12/26 | (2006.01) | |
| H04J 1/16 | (2006.01) | |
| H04J 3/14 | (2006.01) | |
| H04W 72/00 | (2009.01) | |
| H04L 5/14 | (2006.01) | |
| H04L 5/00 | (2006.01) | |
| H04W 72/12 | (2009.01) | |

(52) U.S. Cl.
CPC .......... *H04W 72/1278* (2013.01); *H04W 72/00* (2013.01); *H04L 5/1469* (2013.01); *H04L 5/0098* (2013.01); *H04L 5/001* (2013.01); *H04L 5/0078* (2013.01); *H04L 5/0057* (2013.01); *H04W 72/12* (2013.01)
USPC ................. 370/329; 370/252; 455/422.1

(58) Field of Classification Search
CPC . H04W 72/1278; H04W 72/12; H04W 72/00; H04W 72/1284; H04W 72/1289
USPC ................ 370/241, 252, 329, 331; 455/422.1
See application file for complete search history.

(56) References Cited

U.S. PATENT DOCUMENTS

| | | | |
|---|---|---|---|
| 2010/0110897 A1* | 5/2010 | Chun et al. ..................... | 370/241 |
| 2010/0265905 A1* | 10/2010 | Lee et al. ........................ | 370/329 |
| 2011/0319068 A1* | 12/2011 | Kim et al. .................. | 455/422.1 |
| 2012/0028631 A1* | 2/2012 | Chun et al. ................. | 455/422.1 |
| 2012/0039302 A1* | 2/2012 | Chun et al. ..................... | 370/331 |
| 2012/0057490 A1* | 3/2012 | Park et al. ..................... | 370/252 |
| 2012/0094651 A1* | 4/2012 | Chun et al. ................. | 455/422.1 |

FOREIGN PATENT DOCUMENTS

| | | |
|---|---|---|
| KR | 10-2010-0051023 A | 5/2010 |
| KR | 10-2010-0116125 A | 10/2010 |
| KR | 10-2010-0118067 A | 11/2010 |

* cited by examiner

*Primary Examiner* — Kwang B Yao
*Assistant Examiner* — Adam Duda
(74) *Attorney, Agent, or Firm* — Jefferson IP Law, LLP (57) ABSTRACT

A method and an apparatus for activating or deactivating a primary carrier and secondary carriers in a Time Division Duplex Long Term Evolution (TDD LTE) system using carrier aggregation are provided. An apparatus includes an User Equipment employing the method corresponding the operation associated with the activation and deactivation of SCells, which thereby performs communication with eNBs without errors.

14 Claims, 8 Drawing Sheets

METHOD AND APPARATUS FOR ACTIVATING OR DEACTIVATING SECONDARY CARRIERS IN TIME DIVISION DUPLEX MOBILE COMMUNICATION SYSTEM USING CARRIER AGGREGATION

CROSS-REFERENCE TO RELATED APPLICATIONS

This application claims the benefit under 35 U.S.C. §119 (e) of a U.S. Provisional application filed on Feb. 21, 2011 in the U.S. Patent and Trademark Office and assigned Ser. No. 61/444,844, and under 35 U.S.C. §119(a) of a Korean patent application filed on Feb. 9, 2012 in the Korean Intellectual Property Office and assigned Serial No. 10-2012-0013283, the entire disclosures of which are hereby incorporated by reference.

BACKGROUND OF THE INVENTION

1. Field of the Invention

This invention relates to Time Division Duplex (TDD) wireless communication systems. More particularly, the present invention relates to activation or deactivation of primary and secondary carriers in a Time Division Duplex Long Term Evolution (TDD LTE) system that simultaneously uses multi-carriers via Carrier Aggregation (CA) technology.

2. Description of the Related Art

With the rapid development of wireless communication technology, communication systems have evolved across generations. One of the examples is a Long Term Evolution (LTE) system, which has been developed as a 4th generation LTE system. LTE systems employ a variety of technologies to meet the rapid increase in traffic demand. One such technology that LTE systems use is Carrier Aggregation (CA). Carrier Aggregation refers to a technology that increases the number of carriers used in communication between User Equipment (UE) and an evolved Node B (eNB). For example, Carrier Aggregation increases the number of carriers used from one carrier as disclosed in the related art to a primary carrier and one or more secondary carriers. Such an increase in the number of carriers used in communication between the UE and the eNB increases the amount of transmission by the number of secondary carriers. In LTE technology, a cell in which a primary carrier is served is referred to as a Primary Cell (PCell) and a cell in which a secondary carrier is served is referred to as a Secondary Cell (SCell).

When using Carrier Aggregation, PCell has an additional complexity to control SCell. That is, a determination as to whether to use SCells at a specific PCell may be made, a determination as to conditions for activating and deactivating the SCells may be made, and the conditions for activating and deactivating the SCells may be monitored. After determining the related factors, PCell can control SCells via the factors. A method for activating SCells is also needed. That is, when PCell receives an instruction for activating or deactivating SCells from eNBs, the real operations are required to be specifically described.

Therefore, a need exists for a system and method for performing a self diagnosis of a device without the inconvenience caused when manually selecting a self diagnosis item from a computer or a user interface.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method for activating or deactivating SCells in a Time Division Duplex (TDD) wireless mobile communication system using Carrier Aggregation.

In accordance with an exemplary embodiment of the invention, a technology where, when activating an SCell, an uplink is activated in the first uplink sub-frame starting according to whether S sub-frame is included during the delay of a period of time, and a downlink is activated in the first downlink sub-frame starting after the delay of a period of time is provided.

In accordance with another exemplary embodiment of the invention, a technology where, when deactivating an SCell, an uplink is deactivated in the first uplink sub-frame starting according to whether S sub-frame is included during the delay of a period of time, and a downlink is deactivated in the first downlink sub-frame starting after the delay of a period of time is provided.

In accordance with another exemplary embodiment of the invention, a method for controlling secondary carriers for User Equipment (UE) in Time Division Duplex (TDD) mobile communication system using Carrier Aggregation (CA) is provided. The method includes receiving, by the UE, a secondary carrier control message for activating or deactivating the secondary carriers from Evolved Node Bs (eNBS), operating a timer if the secondary carrier control message corresponds to a message for activating a particular secondary carrier, and activating the forward direction of the particular secondary carrier in a downlink sub-frame arrived first after the timer has expired.

In accordance with another exemplary embodiment of the invention, a User Equipment (UE) for controlling secondary carriers in Time Division Duplex (TDD) mobile communication system using Carrier Aggregation (CA) is provided. The User Equipment includes a transceiver for transmitting to or for receiving symbols from an Evolved Node B (eNB), and a controller. The controller receives a secondary carrier control message for activating or for deactivating the secondary carriers from the eNB. The controller operates a timer if the secondary carrier control message corresponds to a message for activating a particular secondary carrier. The controller activates the forward direction of the particular secondary carrier in a downlink sub-frame arrived first after the timer has expired.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
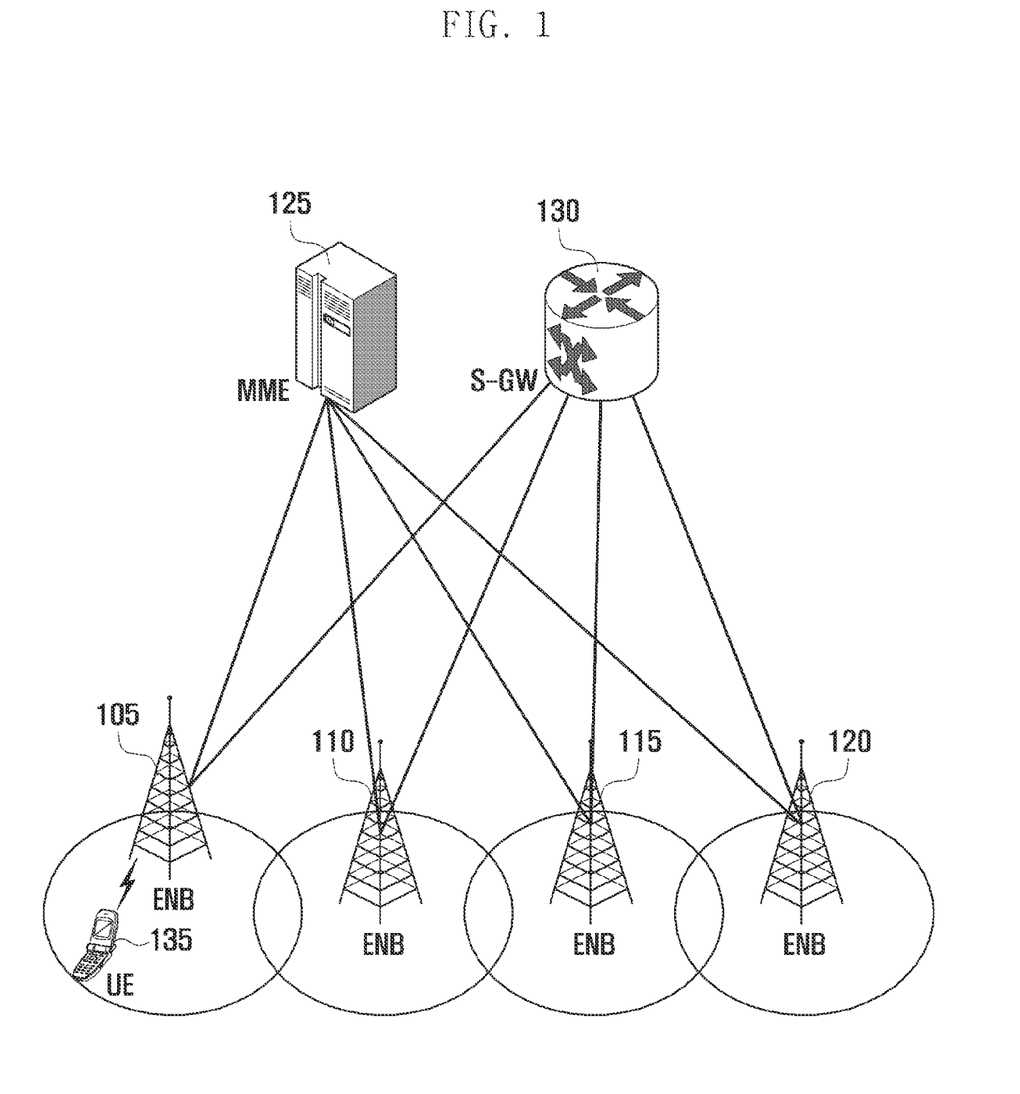
FIG. 1 illustrates a view of the configuration of a Long Term Evolution (LTE) system according to an exemplary embodiment of the present invention.

FIG. 1 illustrates a view of the configuration of a Long Term Evolution (LTE) system according to an exemplary embodiment of the present invention.

Referring to FIG. 1, the LTE system configures the wireless access network, including evolved Node Bs (eNBs) 105, 110, 115, and 120, a Mobility Management Entity (MME) 125, and a Serving-Gateway (S-GW) 130. User Equipment (UE) 135 is connected to the eNB 105, 110, 115, or 120 and the S-GW 130 via an external network.

According to exemplary embodiments of the present invention, eNBs 105 to 120 correspond to, for example, Node Bs of a Universal Mobile Telecommunication System (UMTS). An eNBs (e.g., an eNB 105, 110, 115, or 120) is connected to UE 135 via wireless channels, and may perform more complex functions relative to an existing Node B or a Node B according to the related art. In an LTE system, because all user traffic, including real-time services such as, for example Voice over Internet Protocol (VoIP) services, is served via shared channels, it is necessary to collect information regarding states (e.g., such as buffer states of UE, available transmission power states, channel states, etc.), and to perform scheduling. For example, each of the eNBs 105 to 120 may perform the scheduling function. One eNB can control a number of cells. For example, in order to implement a transmission rate of 100 Mbps, an LTE system employs Orthogonal Frequency Division Multiplexing (OFDM) at a bandwidth of 20 MHz. The LTE system also employs Adaptive Modulation and Coding (AMC) to determine the modulation scheme and the channel coding rate, according to channel states of a UE.

S-GW 130 is a device that provides data bearers. For example, S-GW 130 can create or remove data bearers according to the control of MME 125. MME 125 performs various control functions, including the mobility management of UE. MME 125 connects to a number of ENBs.

Figure 2:
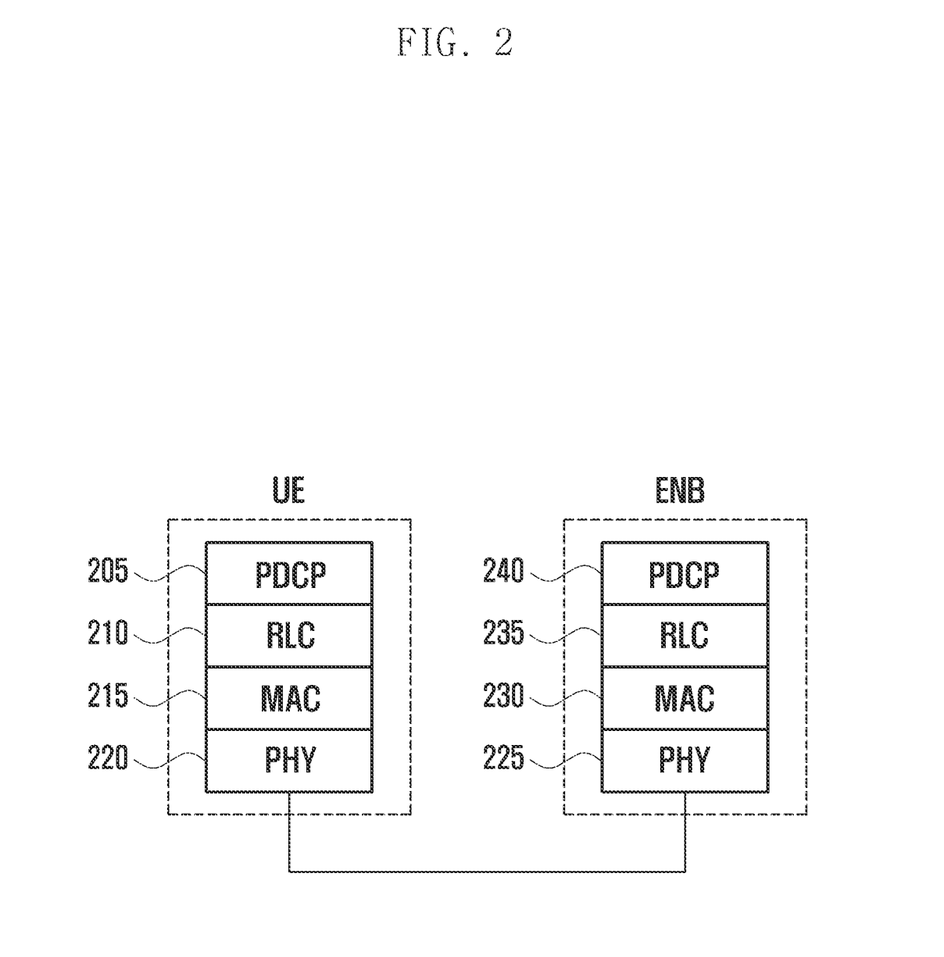
FIG. 2 illustrates a view of a wireless protocol stack of an LTE system according to an exemplary embodiment of the present invention.

FIG. 2 illustrates a view of a wireless protocol stack of an LTE system according to an exemplary embodiment of the present invention.

Referring to FIG. 2, a UE and an ENB each include a Packet Data Convergence Protocol (PDCP) 205 or 240, a Radio Link Control (RLC) 210 or 235, a Medium Access Control (MAC) 215 or 230, and a Physical (PHY) layer 220 or 225. The PDCP 205 and 240 performs compression decompression of Internet Protocol (IP) headers. The RLC 210 and 235 reconfigure PDCP Packet Data Unit (PDU) to an appropriate size and perform an Automatic Repeat reQuest (ARQ) operation. MAC 215 and 230 connect to a number of RLC layer devices configured in one User Equipment. MAC 215 and 230 multiplex RLC PUDs to MAC PDUs, and de-multiplex RLC PDUs from MAC PDUs. Physical layers (PHY) 220 and 225 in UE and ENB channel-code and modulate data from the upper layers, create OFDM symbols, and transmit the OFDM symbols via a wireless channel. In addition, PHY 220 and 225 demodulate and channel-decode OFDM symbols transmitted via a wireless channel into high layer data, and transfer the data to the upper layers.

Figure 3:
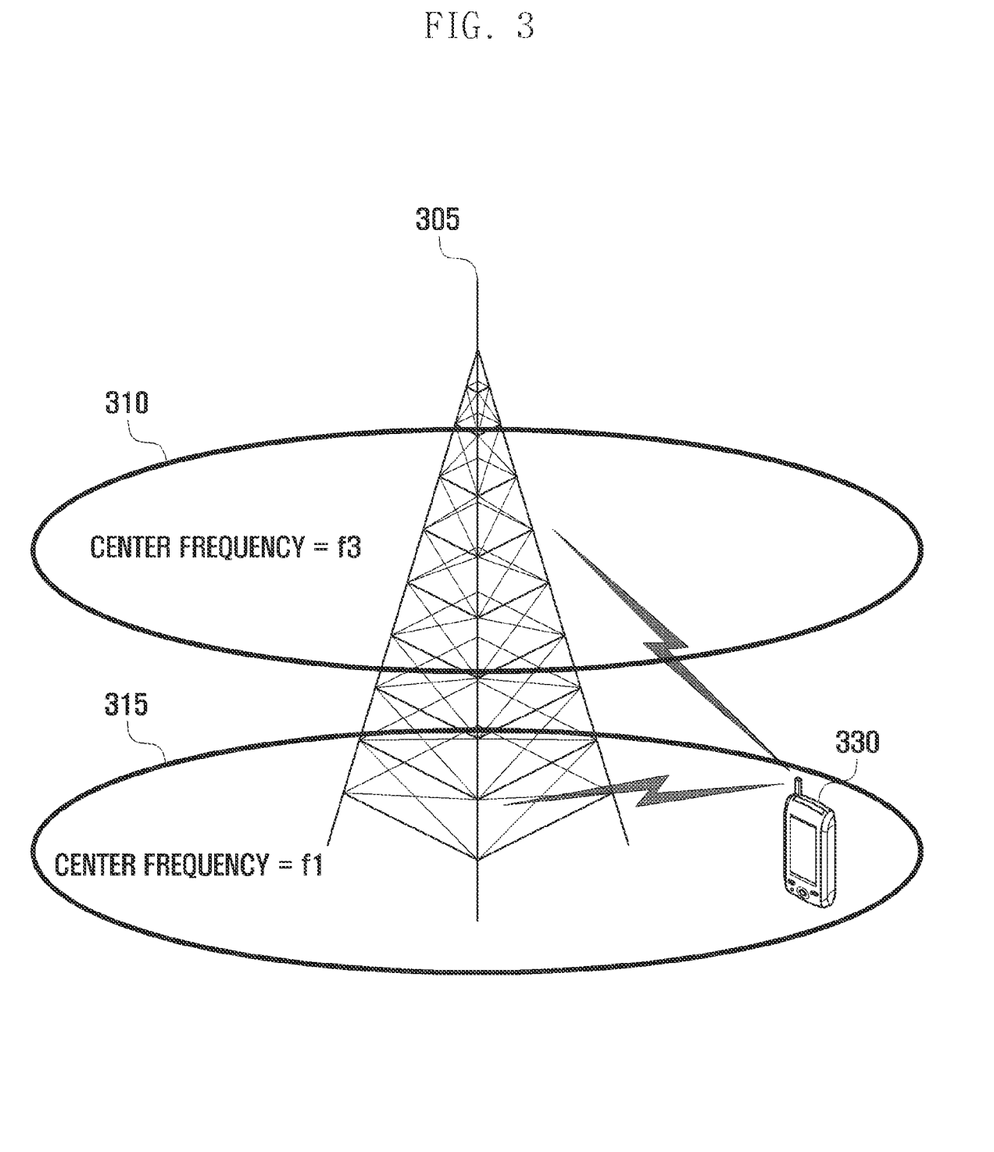
FIG. 3 illustrates a view to describe Carrier Aggregation (CA) in User Equipment (UE) according to an exemplary embodiment of the present invention.

FIG. 3 illustrates a view to describe Carrier Aggregation (CA) in User Equipment (UE) according to an exemplary embodiment of the present invention.

Referring to FIG. 3, an eNB transmits/receives multi-carriers over frequency bands. For example, the eNB may broadcast carriers over frequency bands. As an example, when an eNB 305 broadcasts a carrier 315 with a center frequency f1 and a carrier 310 with a center frequency f3, a regular UE (e.g., a UE according to the related art) transmits/receives data via one of the carriers 315 and 310. However, according to exemplary embodiments of the invention, a UE that can perform Carrier Aggregation can simultaneously transmit/receive data using a number of carriers. For example, a UE 330 having a CA capability may use multiple carriers including the carriers 310 and 315 in parallel to send and receive data. According to exemplary embodiments of the present invention, eNB 305 can allocate more carriers to UE 330 that can perform Carrier Aggregation, such that the corresponding data transmission rate of UE 330 is increased.

If it is assumed that a cell is formed by one forward carrier and one reverse carrier (e.g., one cell is formed of a downlink carrier and one cell is formed of an uplink carrier) that are each transmitted/received from/by one eNB, then Carrier Aggregation may be understood as a UE that simultaneously transmits/receives data via a number of cells. Accordingly, the maximum transmission rate of the UE may increase in proportion to the number of aggregated carriers.

In the following description, when a UE receives data via a forward carrier (e.g., a downlink carrier) or transmits data via a reverse carrier (e.g., an uplink carrier) corresponds to an example in which the UE sends and receives data via a control channel and a data channel provided by a cell corresponding to a frequency band and a center frequency characterizing the carrier. For the sake of convenience, the exemplary embodiments of the present invention will be described based on an LTE system. However, it should be understood that the exemplary embodiments of the present invention are not limited to such an example. For example, exemplary embodiments of the invention can be applied to various wireless communication systems that support Carrier Aggregation.

Figure 4:
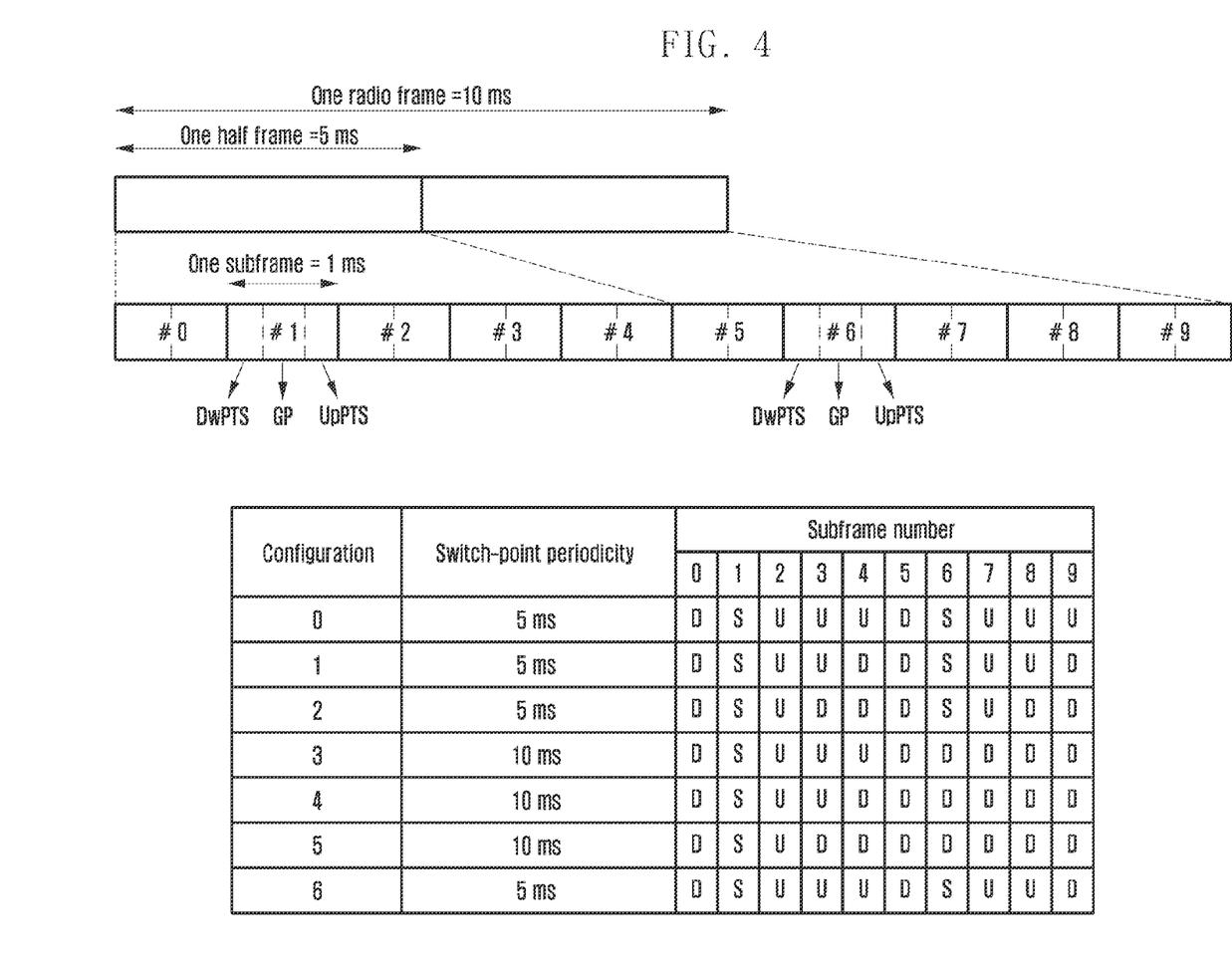
FIG. 4 illustrates a frame structure of a Time Division Duplex (TDD) system with switch-point periodicity of 5 ms according to an exemplary embodiment of the present invention.

FIG. 4 illustrates a frame structure of a Time Division Duplex (TDD) system with switch-point periodicity of 5 ms according to an exemplary embodiment of the present invention.

As shown in the table, frames corresponding to configurations 0, 1, 2 and 6 have two special sub-frames at sub-frame numbers, #1 and #6, respectively. Likewise, frames corresponding to configurations 3, 4, and 5 have only one special sub-frame at sub-frame number, #1.

One frame is 10 ms long, and is sub-divided into 10 sub-frames (e.g., corresponding to #0, #1, #2, . . . , #9). Each sub-frame is 1 ms long. Sub-frames #0, #2, #3, #4, #5, #7, #8, and #9 may be used as downlink sub-frame (e.g., shown by 'D') or uplink sub-frame (e.g., shown by 'U'), according to configurations or TDD configurations. With respect to TDD configuration No. 0, sub-frames #0 and #5 are used as downlink sub-frames, and sub-frames #2, #3, #4, #7, #8, and #9 are used as uplink sub-frame. Likewise, with respect to TDD configuration No. 1, sub-frames #0, #4, #5, and #9 are used as downlink sub-frames, and sub-frames #2, #3, #7, and #8 are used as uplink sub-frames.

Referring to FIG. 4, sub-frames #1 and #6 (corresponding to configurations 0, 1, 2, and 6) are special sub-frames between downlink and uplink sub-frames. That is, the special sub-frame refers to a slot that is divided into a Downlink carriers Pilot Time Slot (DwPTS), a Guard Period (GP), and an Uplink Pilot Time Slot (UpPTS). In the DwPTS, downlink data can be transmitted. In the UpPTS, uplink data cannot be transmitted. However, during UpPTS, a Sounding Reference Symbol (SRS) can be transmitted. A GP refers to a pause section between downlink and uplink.

The following description explains exemplary embodiments of the present invention in which a UE receives instructions for activating and deactivating SCells from eNBs. Exemplary embodiments of the present invention include a method that operates, when a UE receives an activation instruction from an eNB, parts of the functions of the UE after a particular time point. Exemplary embodiments of the present invention also propose a method that interrupts, when a UE receives a deactivation instruction from an eNB, parts of the functions of the UE before a particular time point, and other parts of the functions after the particular time point.

For example, a period of time required to perform and terminate an operation may differ from a period of time required to perform and terminate another operation. If the operations are set to be activated or terminated at the same time point, the period of time is set to the operation requiring a longer period of time than the other (e.g., the period of time is set to correspond to the longest of the required periods of time). This causes the increase in the activation and deactivation. For example, immediately upon receiving an instruction from an eNB, a UE cannot use the SCell to transmit/receive data because it takes an additional period of time to activate devices to use the SCell. In addition, although the devices to use the SCell are activated, parts of the functions may require an additional period of time to be normally operated.

Figure 5:
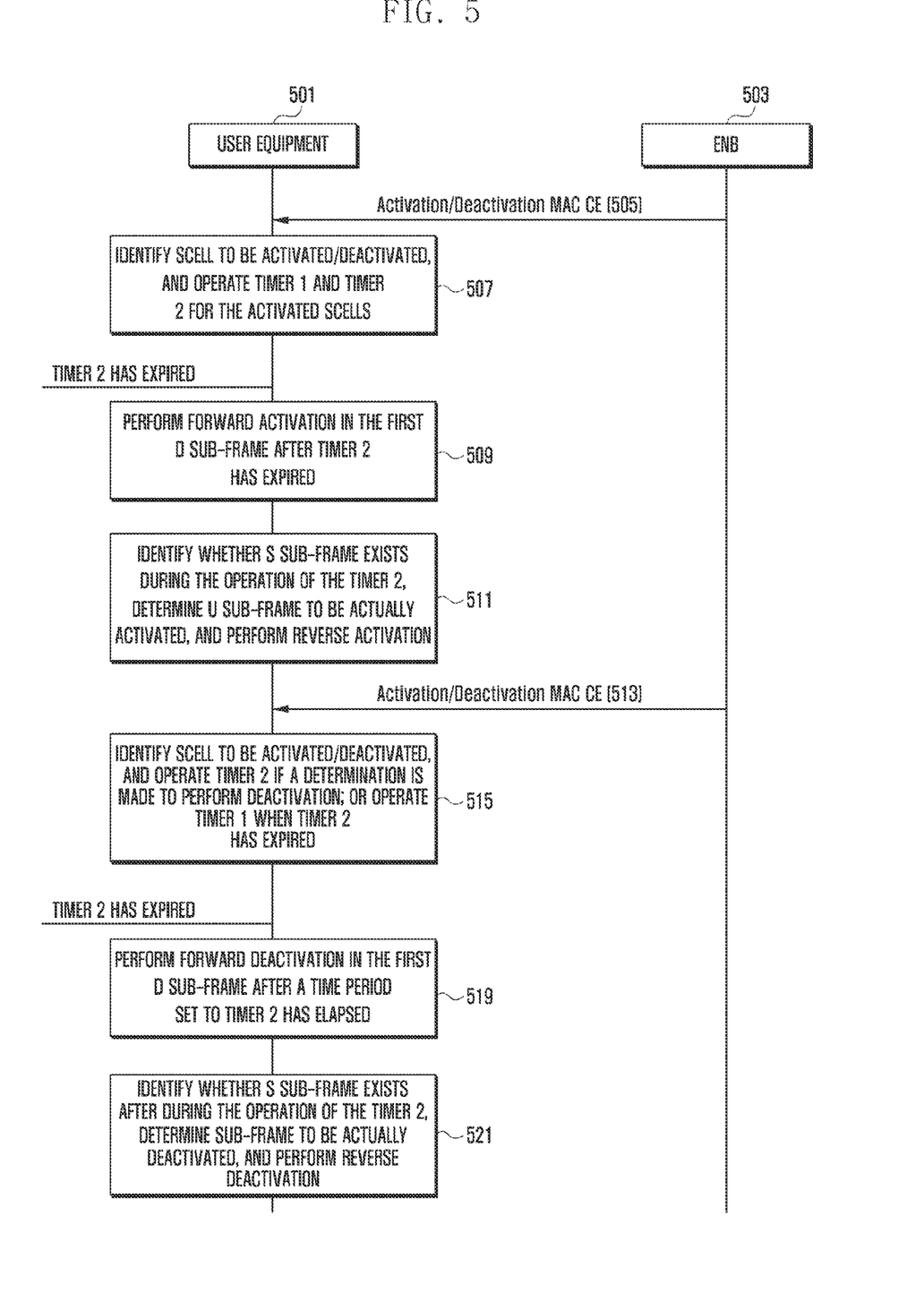
FIG. 5 illustrates a flow chart that describes a message flow in a control method according to an exemplary embodiment of the present invention.

FIG. 5 illustrates a flow chart that describes a message flow in a control method according to an exemplary embodiment of the present invention.

Referring to FIG. 5, according to exemplary embodiments of the present invention, eNB 503 informs UE 501 of SCells to be activated or deactivated, via N-th sub-frame, using an SCell control message (or, for example, a secondary carrier control message) at step 505. In the following description, it is assumed that the SCell control message is an Activation/Deactivation MAC Control Element (CE). As an example, the Activation/Deactivation MAC CE has a fixed size of 8 bits and includes seven C fields and one R field. The R field is a reserved field. The seven C fields are expressed by Ci (e.g., C7, C6, C5, C4, C3, C2, C1). For example, if SCelli is set to '1,' then eNB informs UE of activation for the secondary carriers. As another example, if SCelli is set to '0,' then eNB informs UE of deactivation for the secondary carriers.

The UE 501 identifies SCells to be activated or deactivated according to the received SCell control message, and respectively operates timer 1 (e.g., a first timer) and timer 2 (e.g., a second timer) for activated SCells at step 507.

Timer 1 is operated per SCell. When a forward or reverse transmission resource is allocated to a corresponding SCell, timer 1 is re-operated. If a carrier is not used until timer 1 has expired, then the carrier is deactivated. Timer 1 expires in sub-frame m, where m is a positive integer (e.g., 8). The integer m is set considering a period of time required for the reception and decoding an Activation/Deactivation MAC CE, and the identification of the meanings. For example, it is preferable that m is set to a relatively larger value, considering UE of a low processing speed.

After the UE 501 has received the Activation/Deactivation MAC CE, the UE 501 activates the forward direction of an SCell in sub-frame m or in the first downlink sub-frame after timer 2 has expired (i.e., the downlink sub-frame first arrived after timer 2 has expired) at step 509. For example, the first downlink sub-frame is expressed as 'D' in the Table of FIG. 4. Activating the forward direction of an SCell means performing the operations related to the forward direction of the SCell from a corresponding sub-frame. For example, operations relate to the forward direction of the SCell may include monitoring Physical Downlink Control CHannel (PDCCH), etc.

Simultaneously, after the UE 501 has received the Activation/Deactivation MAC CE and timer 2 has expired in sub-frame m, the UE 501 determines whether a special sub-frame existed during the operation of the timer 2 at step 511. For example, the special sub-frame corresponds to the sub-frame denoted by S in the Table of FIG. 4.

When the UE 501 determines that an S sub-frame existed during the operation of the timer 2, the UE 501 activates the reverse direction of the SCell in the S sub-frame or in a sub-frame without the first PDCCH after timer 2 has expired (i.e., if the PDCCH arrived first after timer 2 has expired) at step 511.

Conversely, when the UE 501 determines that an S sub-frame did not exist during the operation of the timer 2, the UE 501 activates the reverse direction of the SCell in the sub-frame following the first S sub-frame or in the first S sub-frame after timer 2 has expired at step 511. For example, activating the reverse direction of an SCell may correspond to performing the following operations related to the reverse direction of the SCell:

1) Start reporting Channel State Information (CSI), where CSI includes a Channel Quality Indicator (CQI), a Precoding Matrix Index (PMI), a Rank Indicator (RI), a Precoder Type Indication (PTI), etc., that allows eNB to assist corresponding UE in link adaptation and scheduling. A description of CQI, PMI, RI, and PTI is provided below.

(1) CQI corresponds to a recommended transmission format, meeting a bit error rate of 10%.

(2) PMI corresponds to a closed-loop spatial multiplexing index.

(3) RI corresponds to a recommended transmission link.

(4) PTI corresponds to a precoder type indicator.

2) Start transmitting a Sounding Reference Symbol (SRS), if the SRS has been preset.

According to another exemplary embodiment of the present invention, when the UE 501 determines that an S sub-frame did not exist during the operation of the timer 2, the UE 501 performs a first operation in the first S sub-frame after the timer has expired, and performs a second operation in the sub-frame following the first S sub-frame after the timer has expired. An example of the first operation may be the transmission of a reverse transmission symbol such as the SRS transmission. An example of the second operation may be a normal reverse transmission, such as Physical Uplink Shared CHannel (PUSCH) transmission.

As described above, according to another exemplary embodiment of the present invention, the operations may be separated because, although a reverse transmission is performed in UpPTS of the S sub-frame, all reverse transmission may not be performed. That is, in UpPTS of the S sub-frame, only a few transmissions such as an SRS transmission can be performed but the PUSCH cannot be supported.

eNB 503 informs UE 501 of SCells to be activated or deactivated, using an SCell control message (or, for example, a secondary carrier control message) at step 513. It is assumed that the secondary carrier control message is an Activation/Deactivation MAC Control Element (CE).

For example, the Activation/Deactivation MAC CE has a fixed size of 8 bits. As an example, the Activation/Deactivation MAC CE includes seven C fields and one R field. The R field is a reserved field. The seven C fields are expressed by Ci (e.g., C7, C6, C5, C4, C3, C2, C1). For example, if SCelli is set to '1,' then eNB informs the UE of activation for the secondary carriers. As another example, if SCelli is set to '0,' then eNB informs the UE of deactivation for the secondary carriers. The index i of SCell is used to represent an identifier for a secondary carrier. For example, the index I of SCell has positive integers 1 to 7. When a new secondary carrier is set, the UE reports the identifier to the eNB, together with the information regarding the secondary carrier.

At step 515, UE 501 identifies SCells to be activated or deactivated according to the received Activation/Deactivation MAC CE, and the UE 501 operates timer 2 if a particular SCell is deactivated. Alternatively, if eNB 503 does not allocates the forward or reverse transmission resource for a corresponding SCell to UE 501 for a preset period of time, without performing step 513 (i.e., without informing UE 501 of SCells to be activated or deactivated), then the UE 501 operates timer 2 although timer 1 has expired. Timer 2 expires in sub-frame m, where m is a positive integer (e.g., 8).

At step 519, the UE 501 deactivates the forward direction of an SCell in the first downlink sub-frame after timer 2 has expired (i.e., the downlink sub-frame arrived first after timer 2 has expired). For example, the first downlink sub-frame is expressed as 'D' in the Table of FIG. 4. Deactivating the forward direction of an SCell corresponds to not performing the operations related to the forward direction of the SCell. For example, operations related to the forward direction of the SCell may include monitoring Physical Downlink Control CHannel (PDCCH), etc.

At step 521, after timer 2 has expired, the UE 501 determines whether a special sub-frame existed during the operation of the timer 2. For example, the special sub-frame may correspond to the sub-frame denoted by S in the Table in FIG. 4. As an example, step 521 may be performed simultaneously with step 519. Further at step 521, when the UE 501 determines that S sub-frame existed during the operation of the timer 2, the UE 501 deactivates the reverse direction of the SCell in a sub-frame without the first PDCCH after timer 2 has expired, or the reverse direction of the SCell in the S sub-frame.

Conversely, when the UE 501 determines that S sub-frame didn't exist during the operation of the timer 2, the UE 501 deactivates the reverse direction of the SCell in the sub-frame following the first S sub-frame or the first S sub-frame after timer 2 has expired at step 521. Deactivating the reverse direction of an SCell corresponds to, for example, interrupting the following operations related to the reverse direction of the SCell:

1) Interrupt reporting CSI
2) Interrupt transmitting SRS

As described above, exemplary embodiments of the present invention include a method in which carriers may be activated and/or deactivated.

Figure 6:
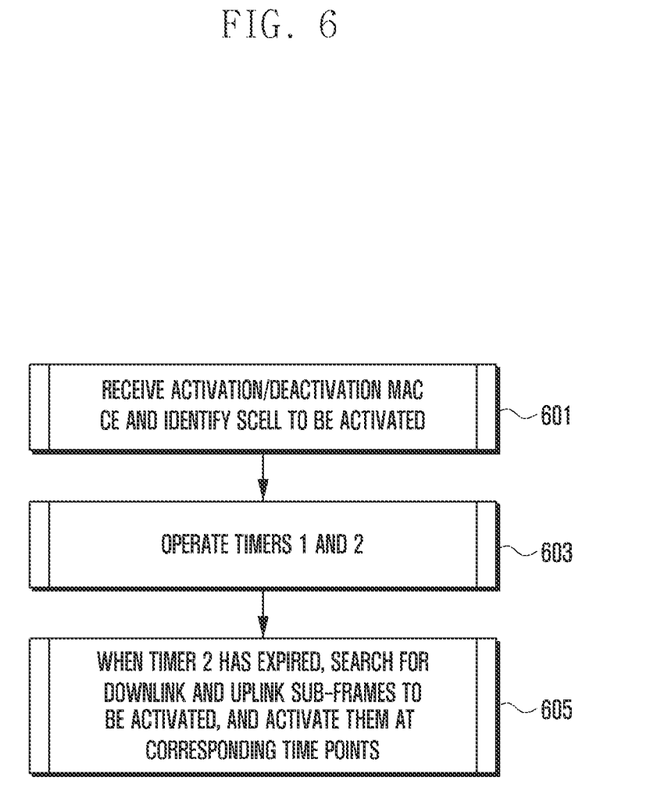
FIG. 6 illustrates a flow chart to describe a method for activating secondary carriers in User Equipment according to an exemplary embodiment of the present invention.

FIG. 6 illustrates a flow chart to describe a method for activating secondary carriers in User Equipment according to an exemplary embodiment of the present invention.

UE receives Activation/Deactivation MAC CE that identifies SCells to be activated or deactivated at step 601. The Activation/Deactivation MAC ME may include a bitmap of 8 bits. For example, at step 601, the UE determines whether new SCells are to be activated according to the received Activation/Deactivation MAC CE, and the UE identifies such SCells that are to be activated according to the received Activation/Deactivation MAC CE.

When UE determines that the Activation/Deactivation MAC CE includes new SCells to be activated, the UE respectively operates timer 1 and timer 2 for the activated SCells at step 603. For example, the UE identifies SCells that are deactivated before receiving the MAC CE, and the UE determines, when receiving MAC CE, whether 'Activation' is marked on the corresponding bitmap of the MAC CE for the deactivated SCells.

At step 605, after timer 2 has expired, the UE activates the forward and reverse directions of the SCells as described above with reference to FIG. 5.

The UE activates the forward direction of an SCell from the first downlink sub-frame after timer 2 has expired. Activating the forward direction of an SCell means performing the operations related to the forward direction of the SCell from a corresponding sub-frame. For example, operations related to the forward direction of the SCell may include monitoring Physical Downlink Control CHannel (PDCCH), etc.

After timer 2 has expired, the UE 501 determines whether a special sub-frame existed during the operation of the timer 2. As an example, a special sub-frame may correspond to a sub-frame denoted by S with reference to FIG. 4. When the UE 501 determines that an S sub-frame existed during the operation of the timer 2, the UE 501 activates the reverse direction of the SCell in a sub-frame without the first PDCCH after timer 2 has expired, or activates the reverse direction of the SCell in the S sub-frame. Conversely, when the UE 501 determines that an S sub-frame did not exist during the operation of the timer 2, the UE 501 activates the reverse direction of the SCell in the sub-frame following the first S sub-frame, or the first S sub-frame after timer 2 has expired. Activating the reverse direction of an SCell may correspond to, for example, performing the following operations related to the reverse direction of the SCell:

1) Start reporting Channel State Information (CSI), where CSI includes a Channel Quality Indicator (CQI), a Precoding Matrix Index (PMI), a Rank Indicator (RI), a Precoder Type Indication (PTI), etc. that allows eNB to assist corresponding UE in link adaptation and scheduling. The CQI, PMI, RI, and PTI are further described below.

(1) CQI corresponds to a recommended transmission format, meeting a bit error rate of 10%.

(2) PMI corresponds to a closed-loop spatial multiplexing index.

(3) RI corresponds to a recommended transmission link.

(4) PTI corresponds to a precoder type indicator.

2) Start transmitting Sounding Reference Symbol (SRS), if the SRS has been preset.

Figure 7:
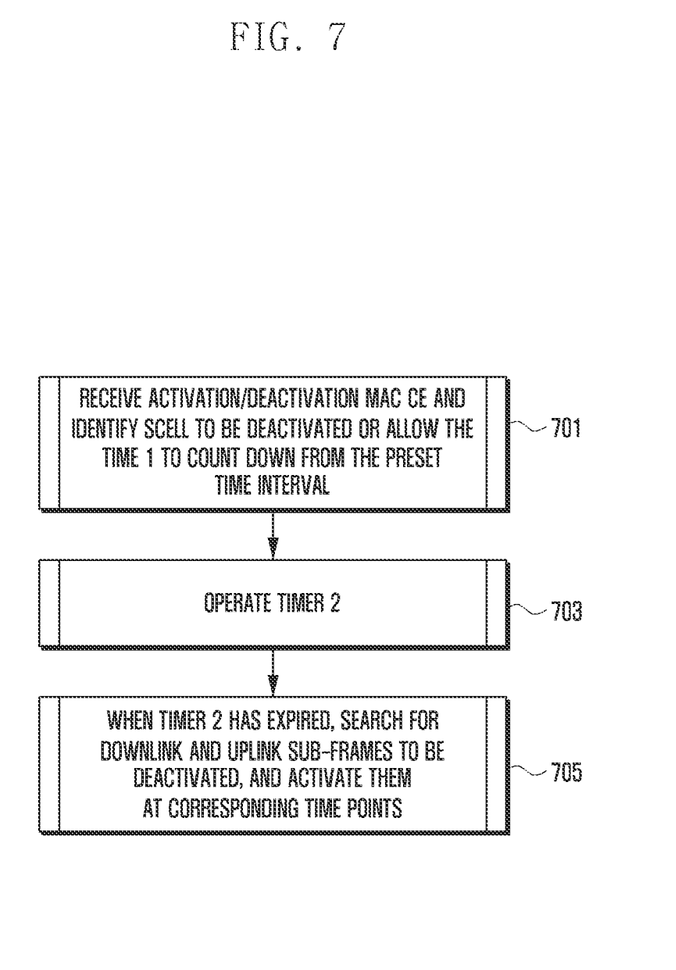
FIG. 7 illustrates a flow chart to describe a method for deactivating secondary carriers in User Equipment according to an exemplary embodiment of the present invention.

FIG. 7 illustrates a flow chart to describe a method for deactivating secondary carriers in User Equipment according to an exemplary embodiment of the present invention.

According to exemplary embodiments of the present invention, a UE identifies SCells to be deactivated according to a received Activation/Deactivation MAC CE or determines whether timer 1, such as, for example, the timer 1 operated at step 603 of FIG. 6, has expired at step 701. For example, the Activation/Deactivation MAC CE may include a bitmap of 8 bits.

When UE determines that timer 1 has expired, the UE operates timer 2 for a corresponding SCell at step 703.

After timer 2 has expired, the UE deactivates the forward and reverse directions of the SCells such as for example, described in the section referring to FIG. 5 at step 705.

For example, after timer 2 has expired, the UE deactivates the forward direction of an SCell from the first downlink sub-frame.

Further at step 705, after timer 2 has expired, the UE determines whether a special sub-frame existed during the operation of the timer 2. For example, the special sub-frame may correspond to the sub-frame denoted by S in the Table in FIG. 4. When the UE determines that an S sub-frame existed during the operation of the timer 2, the UE deactivates the reverse direction of the SCell in a sub-frame without the first PDCCH after timer 2 has expired, or the UE deactivates the reverse direction of the SCell in the S sub-frame. Conversely, when the UE determines that an S sub-frame did not exist during the operation of the timer 2, the UE deactivates the reverse direction of the SCell in the sub-frame following the first S sub-frame, or the first S sub-frame after timer 2 has expired. Deactivating the reverse direction of an SCell corresponds to, for example, interrupting the following operations related to the reverse direction of the SCell:

1) Interrupt reporting CSI
2) Interrupt transmitting SRS

As described above, exemplary embodiments of the present invention can perform preset operations at preset times when activating or deactivating SCells, using Carrier Aggregation, thereby preventing the malfunctions. For example, according to exemplary embodiments of the present invention, a TDD system may perform preset operations at preset times when activating or deactivating SCells, using Carrier Aggregation, thereby preventing malfunctions.

Figure 8:
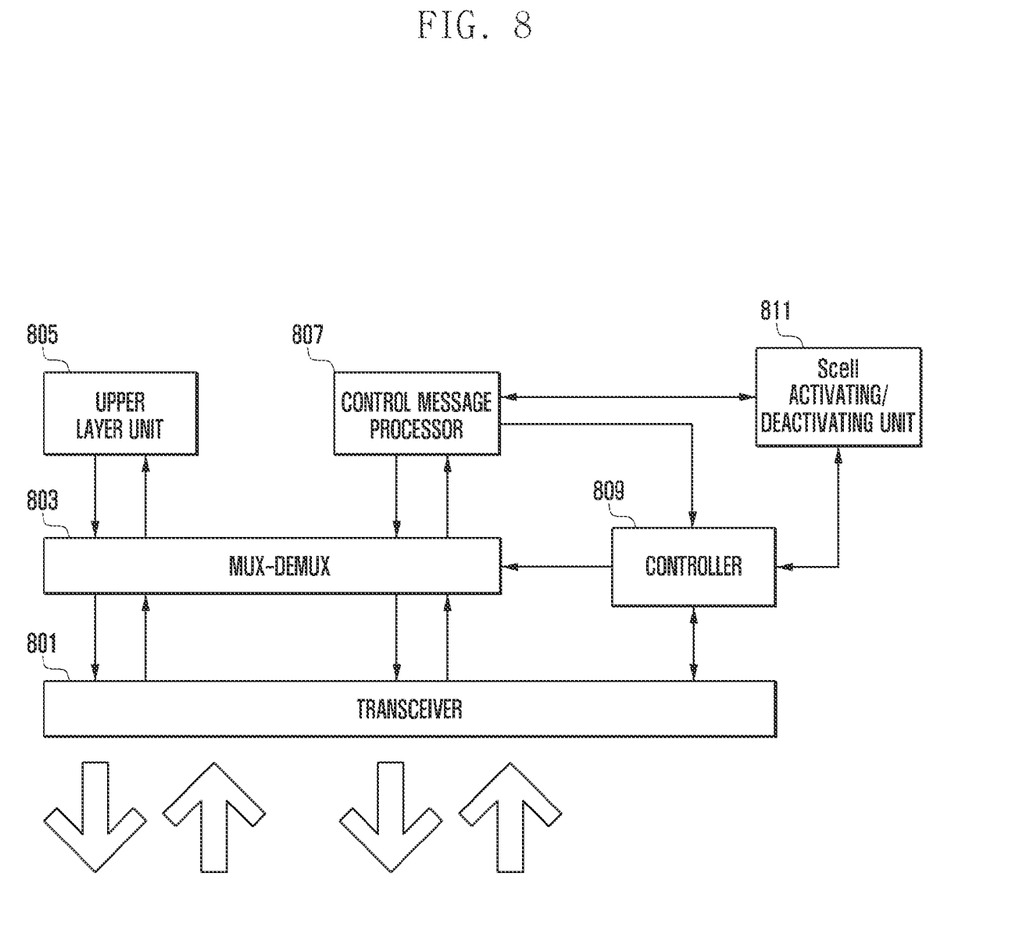
FIG. 8 illustrates a schematic block diagram of User Equipment according to an exemplary embodiment of the present invention.

FIG. 8 illustrates a schematic block diagram of User Equipment according to an exemplary embodiment of the present invention.

Referring to FIG. 8, the UE may include a transceiver 801, a multiplexer-demultiplexer (mux/demux) unit 803, an upper layer unit 805, a control message processor 807, a controller 809, and an SCell activating/deactivating unit 811.

According to exemplary embodiments of the present invention, the UE transmits/receives, to/from the other systems, data via the upper layer unit 805, and control messages via the control message processor 807. In an operation corresponding to transmission of data, the controller 809 controls the multiplexer-demultiplexer (mux-demux) 803 so as to multiplex data, and controls the transceiver 801 so as to transmit the multiplexed data. In an operation corresponding to reception of data, the controller 809 controls the transceiver 801 so as to receive physical symbols, and controls the multiplexer-demultiplexer 803 so as to de-multiplex the symbols, and transfers the de-multiplexed data to the upper layer unit 805 or the control message processor 807 according to the control message.

According to exemplary embodiments of the present invention, the control message processor 807 receives the Activation/Deactivation MAC CE, and informs the SCell activating/deactivating unit 811 of the reception of the Activation/Deactivation MAC CE. When corresponding SCells are activated, the timers 1 and 2 are operated. After that, the SCell activating/deactivating unit 811 searches for uplink and downlink sub-frames to be activated after timer 2 has expired, and activates them at corresponding times.

If the SCell activating/deactivating unit 811 receives a command for deactivating the activated SCell or the timer 1 for the activated SCell has expired, the SCell activating/deactivating unit 811 operates the timer 2. After that, the SCell activating/deactivating unit 811 searches for uplink and downlink sub-frames to be deactivated after timer 2 has expired, and deactivates the uplink and downlink sub-frames at corresponding times.

Although the exemplary embodiments of the present invention described herein include an UE that is implemented in such a way that the components are distinguished according to the functions, it should be understood that the present invention is not limited to such embodiments. For example, the exemplary embodiments may be modified in such a way that the controller 809 can perform parts of the operations of the control message processor 807 as follows.

When the controller 809 receives, from an eNB, a secondary carrier control message for activating or deactivating secondary carriers, and the secondary carrier control message is a message for activating a particular secondary carrier, the controller 809 operates a timer. The controller 809 may activate the forward direction of the secondary carrier in the downlink sub-frame arrived first after a timer has expired.

After a timer has expired, the controller 809 may determine whether an S sub-frame existed during the operation of the timer. When the controller 809 determines that an S sub-frame existed, the controller 809 activates the reverse direction of the second carrier in the S sub-frame or in a sub-frame without the PDCCH arrived first after the timer has expired.

When the controller 809 determines that an S sub-frame did not exist, the controller activates the reverse direction of the secondary carrier in the S sub-frame arrived first after the timer has expired or in the sub-frame following the first S sub-frame.

Alternatively, when the controller 809 determines that an S sub-frame did not exist, the controller performs a first operation in the S sub-frame arrived first after the timer has expired and performs a second operation in the sub-frame following the S sub-frame arrived first after the timer has expired. Because the first and second operations have been described above, the detailed description of the first and second operations is omitted in the following description.

When the secondary carrier control message is a message for deactivating a particular secondary carrier, the controller 809 operates the timer. The controller 809 deactivates the forward direction of the secondary carrier in the downlink sub-frame arrived first after the timer has expired.

After the timer has expired, the controller 809 identifies whether an S sub-frame existed during the operation of the timer. When the controller 809 determines that an S sub-frame existed, the controller deactivates the reverse direction of the second carrier in the S sub-frame or in a sub-frame without the PDCCH arrived first after the timer has expired.

When the controller 809 determines that an S sub-frame did not exist, the controller deactivates the reverse direction of the secondary carrier in the S sub-frame arrived first after the timer has expired (which is the first S sub-frame) or in the sub-frame following the first S sub-frame.

As described above, exemplary embodiments of the present invention can perform preset operations at preset times when activating or deactivating SCells, using Carrier Aggregation, thereby preventing the malfunctions. For example, according to exemplary embodiments of the present invention, a TDD system may perform preset operations at preset times when activating or deactivating SCells, using Carrier Aggregation, thereby preventing malfunctions.

As described above, exemplary embodiments of the present invention may include a method for controlling secondary carriers which can perform the entire operation required for the activation and deactivation of SCells in TDD systems, without errors.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling at least one secondary cell by a terminal in a mobile communication system using carrier aggregation (CA), the method comprising:
   receiving, by the terminal, a control message for activating a secondary cell from a base station;
   transmitting, by the terminal, a first information using the secondary cell in a first subframe; and
   transmitting, by the terminal, a second information using the secondary cell no earlier than the first subframe,
   wherein the first information includes channel status information (CSI) of the second cell.

2. The method of claim 1, wherein the transmitting a first information using the secondary cell in the first subframe comprises reporting CSI for the secondary cell,
   wherein the transmitting a second information using the secondary cell no earlier than the first subframe comprises transmitting sounding reference signal (SRS) for the secondary cell.

3. The method of claim 1, wherein a time interval between receiving the control message and transmitting the first information is a time corresponding to 8 subframes.

4. The method of claim 1, further comprising:
   activating, by the terminal, a forward direction of the secondary cell after the transmitting the first information using the secondary cell in the first subframe.

5. An apparatus for controlling at least one secondary cell by a terminal in a mobile communication system using carrier aggregation (CA), the apparatus comprising:
   a transceiver for communicating with another network node; and
   a controller for receiving a control message for activating a secondary cell from a base station, transmitting a first information using the secondary cell in a first subframe, and transmitting a second information using the secondary cell no earlier than the first subframe,
   wherein the first information includes channel status information (CSI) of the secondary cell.

6. The apparatus of claim 5, wherein the transmission of the first information comprises reporting CSI for the secondary cell,
   wherein the transmission of the second information comprises transmitting sounding reference signal (SRS) for the secondary cell.

7. The apparatus of claim 5, wherein a time interval between receiving the control message and transmitting the first information is a time corresponding to 8 subframes.

8. The apparatus of claim 5, wherein the controller activates a forward direction of the secondary cell after the transmitting a first information using the secondary cell in the first subframe.

9. A method for controlling at least one secondary cell by a terminal in a mobile communication system using carrier aggregation (CA), the method comprising:
   receiving, by the terminal, a control message for activating a secondary cell from a base station;
   activating, by the terminal, a first reverse direction transmission of the secondary cell after a duration elapsed after receiving the control message; and
   activating, by the terminal, a second reverse direction transmission of the secondary cell no earlier than activating the first reverse direction transmission for the secondary cell,
   wherein the first reverse direction transmission comprises reporting channel status information (CSI) for the secondary cell.

10. The method of claim 9, wherein the duration is a time corresponding to 8 subframes.

11. The method of claim 9,
    wherein the second reverse direction transmission comprises transmitting sounding reference signal (SRS) for the secondary cell.

12. An apparatus for controlling at least one secondary cell by a terminal in a mobile communication system using carrier aggregation (CA), the apparatus comprising:
    a transceiver for communicating other network node; and
    a controller for receiving a control message for activating a secondary cell from a base station, for activating a first reverse direction transmission of the secondary cell after a duration elapsed after receiving the control message and activating a second reverse direction transmission of the secondary cell no earlier than activating the first reverse direction transmission for the secondary cell,
    wherein the first reverse direction transmission comprises reporting channel status information (CSI) for the secondary cell.

13. The method of claim 12, wherein the duration is a time corresponding to 8 subframes.

14. The method of claim 12,
    wherein the second reverse direction transmission comprises transmitting sounding reference signal (SRS) for the secondary cell.

* * * * *